United States Patent
Graf et al.

(10) Patent No.: US 9,733,929 B1
(45) Date of Patent: Aug. 15, 2017

(54) SYSTEMS AND METHODS FOR RESTORING APPLICATIONS

(75) Inventors: Nicholas Graf, Culver City, CA (US);
Adam Glick, Culver City, CA (US);
Spencer Smith, El Segundo, CA (US)

(73) Assignee: Symantec Corporation, Mountain View, CA (US)

(*) Notice: Subject to any disclaimer, the term of this patent is extended or adjusted under 35 U.S.C. 154(b) by 941 days.

(21) Appl. No.: 12/839,615

(22) Filed: Jul. 20, 2010

(51) Int. Cl.
*G06F 9/44* (2006.01)

(52) U.S. Cl.
CPC ..................... *G06F 8/71* (2013.01)

(58) Field of Classification Search
USPC ........................... 717/168–178; 707/609–686
See application file for complete search history.

(56) References Cited

U.S. PATENT DOCUMENTS

| | | | | |
|---|---|---|---|---|
| 5,247,683 A * | 9/1993 | Holmes et al. | | 709/221 |
| 5,535,381 A * | 7/1996 | Kopper | | 710/52 |
| 5,696,975 A * | 12/1997 | Moore et al. | | 717/168 |
| 5,930,513 A * | 7/1999 | Taylor | | 717/174 |
| 6,205,527 B1 * | 3/2001 | Goshey et al. | | 711/162 |
| 6,505,216 B1 * | 1/2003 | Schutzman et al. | | |
| 6,615,405 B1 * | 9/2003 | Goldman et al. | | 717/174 |
| 6,981,252 B1 * | 12/2005 | Sadowsky | | 717/176 |
| 7,117,495 B2 * | 10/2006 | Blaser et al. | | 717/174 |
| 7,130,970 B2 * | 10/2006 | Devassy et al. | | 711/154 |
| 7,409,509 B2 * | 8/2008 | Devassy et al. | | 711/154 |
| 7,668,880 B1 * | 2/2010 | Carroll | | 707/640 |
| 8,261,253 B2 * | 9/2012 | Brehm et al. | | 717/168 |
| 2002/0166117 A1 * | 11/2002 | Abrams et al. | | 717/177 |
| 2002/0188939 A1 * | 12/2002 | Hediger et al. | | 717/174 |
| 2003/0028736 A1 * | 2/2003 | Berkowitz et al. | | 711/162 |
| 2003/0037057 A1 * | 2/2003 | Winwood | | 707/100 |
| 2004/0083234 A1 * | 4/2004 | Higuchi | | 707/104.1 |
| 2004/0107199 A1 * | 6/2004 | Dalrymple et al. | | 707/100 |
| 2005/0091192 A1 * | 4/2005 | Probert et al. | | 707/1 |

(Continued)

OTHER PUBLICATIONS

Y. Breitbart; Merging Application-Centric and Data-Centric Approaches to Support Transaction-Oriented Multi-System Workflows; Dept. of Computer Science; Sigmod Record vol. 22 No. 3; Sep. 1993.

(Continued)

*Primary Examiner* — Chat Do
*Assistant Examiner* — Sergio J Curbelo, III
(74) *Attorney, Agent, or Firm* — FisherBroyles LLP

(57) ABSTRACT

A method for restoring applications may include: 1) identifying an installation file that includes an application; 2) monitoring the installation file to identify a set of application files generated as a result of installing the application from the installation file; 3) assigning, to each application file in the set of application files, an application identifier that associates each application file in the set of application files with the application; 4) backing up the application by copying each application file in the set of application files to a backup storage system; 5) receiving a request to restore each application file in the set of application files; and 6) restoring the application by using the application identifier to locate each application file in the set of application files within the backup storage system. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2005/0091535 A1* | 4/2005 | Kavalam et al. | ............. | 713/201 |
| 2007/0174832 A1* | 7/2007 | Brehm et al. | ................. | 717/174 |
| 2007/0294687 A1* | 12/2007 | Masselle et al. | ............. | 717/174 |
| 2008/0016127 A1* | 1/2008 | Field | ............................ | 707/202 |
| 2008/0098387 A1* | 4/2008 | Lo et al. | ........................ | 717/174 |
| 2009/0013251 A1* | 1/2009 | Kim | .............................. | 715/705 |

OTHER PUBLICATIONS

Business Wire; BMC Software Announces Application-Centric Storage Management Consortium Partner Program; http://encyclopedia.com/doc/1F1-73024901.html; Apr. 10, 2001.

CommmVault; Microsoft Windows—Centric, Unified Data management for Heterogeneous Application-Integrated Backup/Restore, Archiving, Compliance, and Data Management.

Hitachi Data Systems; Hitachi Backup and Recovery Software, Powered by CommVault; Application Brief; Apr. 2005.

"CommVault", http://www.commvault.com/, accessed May 4, 2010, (Dec. 2, 1998).

"Tivoli Storage Manager", http://www-03.ibm.com/software/products/en/tivostormana, as accessed May 4, 2010, IBM, (On or before May 4, 2010).

"Arcserve", http://www.arcserve.com/us/default.aspx, as accessed May 4, 2010, (On or before May 4, 2010).

* cited by examiner

SYSTEMS AND METHODS FOR RESTORING APPLICATIONS

BACKGROUND

From a backup and restore point of view, applications are composed of both their executables and the data files they create, modify, and/or use. When an application is in a bad state but the remainder of the system is in a good state, a system administrator may attempt to initiate a partial restore of just the bad application. However, identifying exactly which files need to be restored can be an error-prone process. Applications are installed into multiple directories, and application data files reside in even more directories. If the administrator selects the wrong set of files to restore, the application may be non-functional or may be in an inconsistent state.

Alternatively, the administrator may attempt to repair a malfunctioning application by restoring the entire file system from a backup storage system. However, since the administrator only needs to repair the malfunctioning application, restoring an entire file-system may be excessive and inefficient. What is needed, therefore, is a mechanism that accurately and efficiently restores individual applications from backup storage systems.

SUMMARY

As will be described in greater detail below, the instant disclosure generally relates to systems and methods for restoring applications. More specifically, the systems and methods described herein may accurately and automatically restore individual applications from backup storage systems.

In certain embodiments, a method for restoring applications may include identifying an installation file that includes an application. For example, a monitoring module may monitor a file system in order to detect when an installation file has been launched to install an application. In this example, the monitoring module may identify the installation file upon detecting that the installation file has been launched to install the application. The installation file may be an executable file or a data file that includes application information used by an installer to install the application.

The monitoring module may also monitor the installation file in order to identify a set of application files generated as a result of installing the application from the installation file. For example, the monitoring module may identify one or more executable files and/or data files that were generated as a result of installing the application.

In addition, the monitoring module may determine whether an application identifier has already been created for the application. This application identifier may associate each application file in the set of application files with the application. If the application identifier has not yet been created, the monitoring module may create the application identifier and then assign the application identifier to each application file in the set of application files. For example, upon determining that an application identifier has not yet been created for the application, the monitoring module may generate a hash of the installation file and assign the hash to the executable and data files in order to associate these files with the application.

If the application identifier already exists, the monitoring module may identify the existing application identifier and then assign it to each application file in the set of application files. The monitoring module may also store the application identifier as metadata of each application file in the set of application files. For example, the monitoring module may store the identifier as metadata of the executable and data files associated with the application.

In some embodiments, the monitoring module may monitor the application to identify at least one additional application file generated by the application file. For example, the monitoring module may identify an additional data file that was generated by the executable file associated with the application while the executable file was executing on the computing device. The monitoring module may then assign the application identifier to the additional application file in order to associate the additional application file with the application.

The monitoring module may also monitor the application to identify at least one additional application file on which the application performs a read/write operation. For example, the monitoring module may identify a data file that is read by the application to perform a task. In this example, the data file may have been generated by a different application but simply read by the application. The monitoring module may then assign the application identifier to the additional application file in order to associate the additional application file with the application.

In one or more embodiments, a backup module may back up the application by copying each application file in the set of application files to a backup storage system. For example, the backup module may copy the executable and data files associated with the application to a backup storage system in order to backup the application. The backup module may ensure that the application is functioning properly prior to backing up the application. The backup module may also include the application identifier as metadata of each application file copied to the backup storage system.

In various embodiments, a restoration module may receive a request to restore the application. In one example, the monitoring module may generate a request to restore the application upon determining that the application is no longer functioning properly, and the restoration module may receive the request to restore the application. In another example, an interface module may present, to a user, a list of applications that have been backed up. In this example, upon determining that the user has selected the application from the list of applications, the interface module may generate the request to restore the application, and the restoration module may receive the request.

The restoration module may then restore the application. More specifically, the restoration module may use the application identifier to locate each application file in the set of application files within the backup storage system. The restoration module may copy each application file in the set of application files from the backup storage system to one or more restore locations. For example, in order to restore the application, the restoration module may replace each application file located within the file system with corresponding files from the backup storage system.

In some embodiments, the monitoring module may identify at least one additional application that has been backed up. The restoration module may receive an additional request to restore the additional application. For example, the restoration module may receive an additional request to restore the application after the interface module determines that the user has also selected the additional application from the list of applications. Upon receiving the additional request, the restoration module may restore the additional application at substantially the same time as the first application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
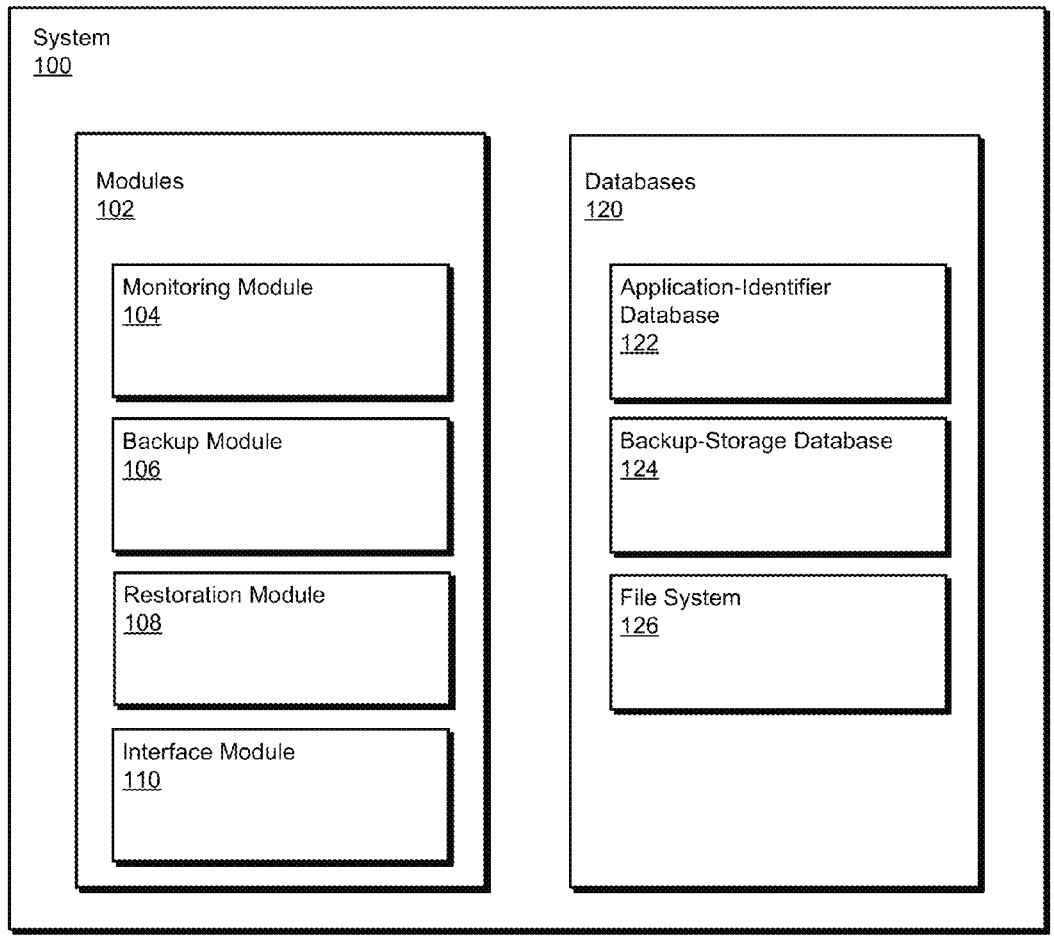
FIG. 1 is a block diagram of an exemplary system for restoring applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for restoring applications. More specifically, the systems and methods described herein may accurately, efficiently, and automatically restore individual applications from backup storage systems.

Figure 2:
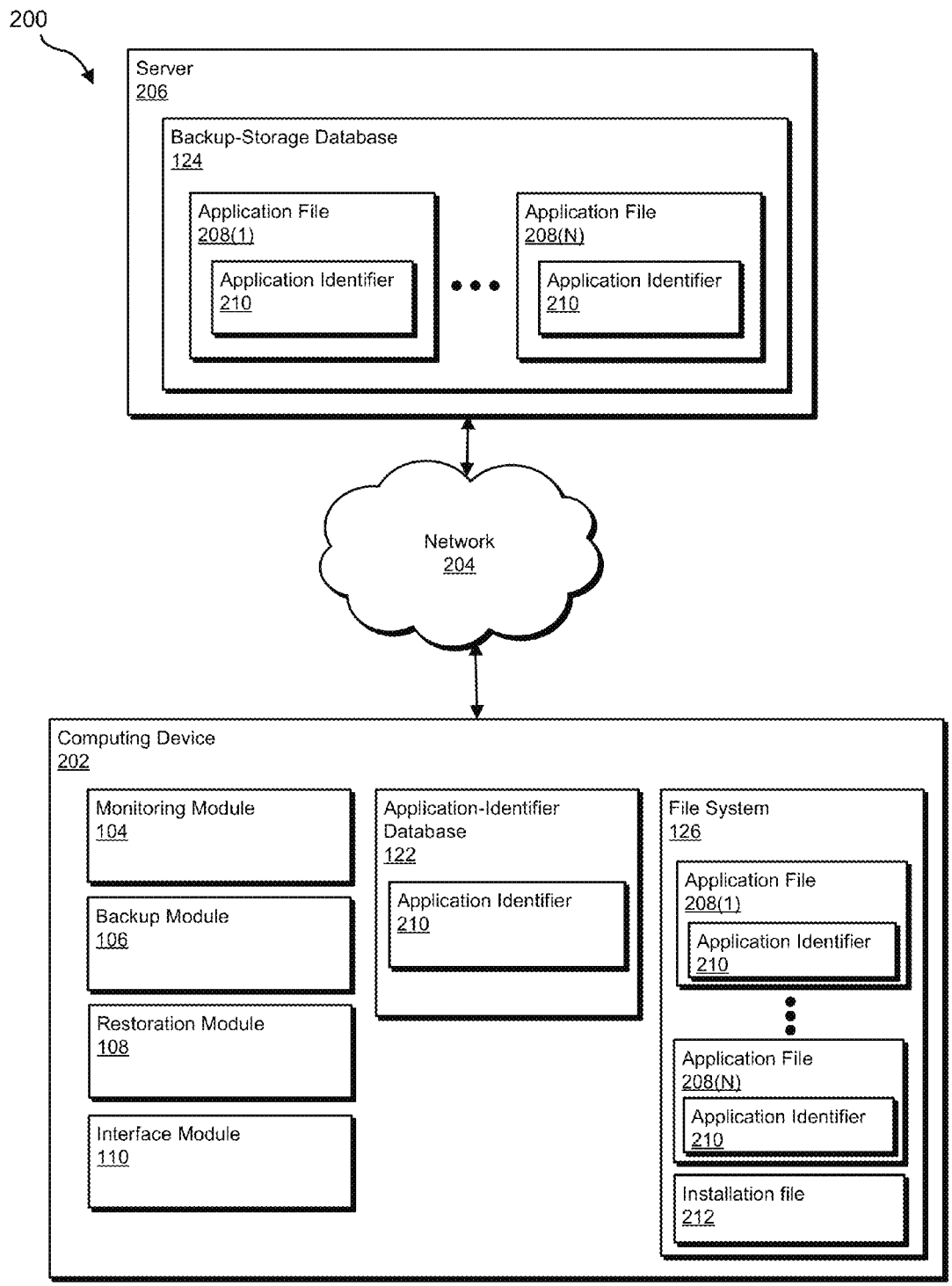
FIG. 2 is a block diagram of an exemplary system for restoring applications.
Figure 3:
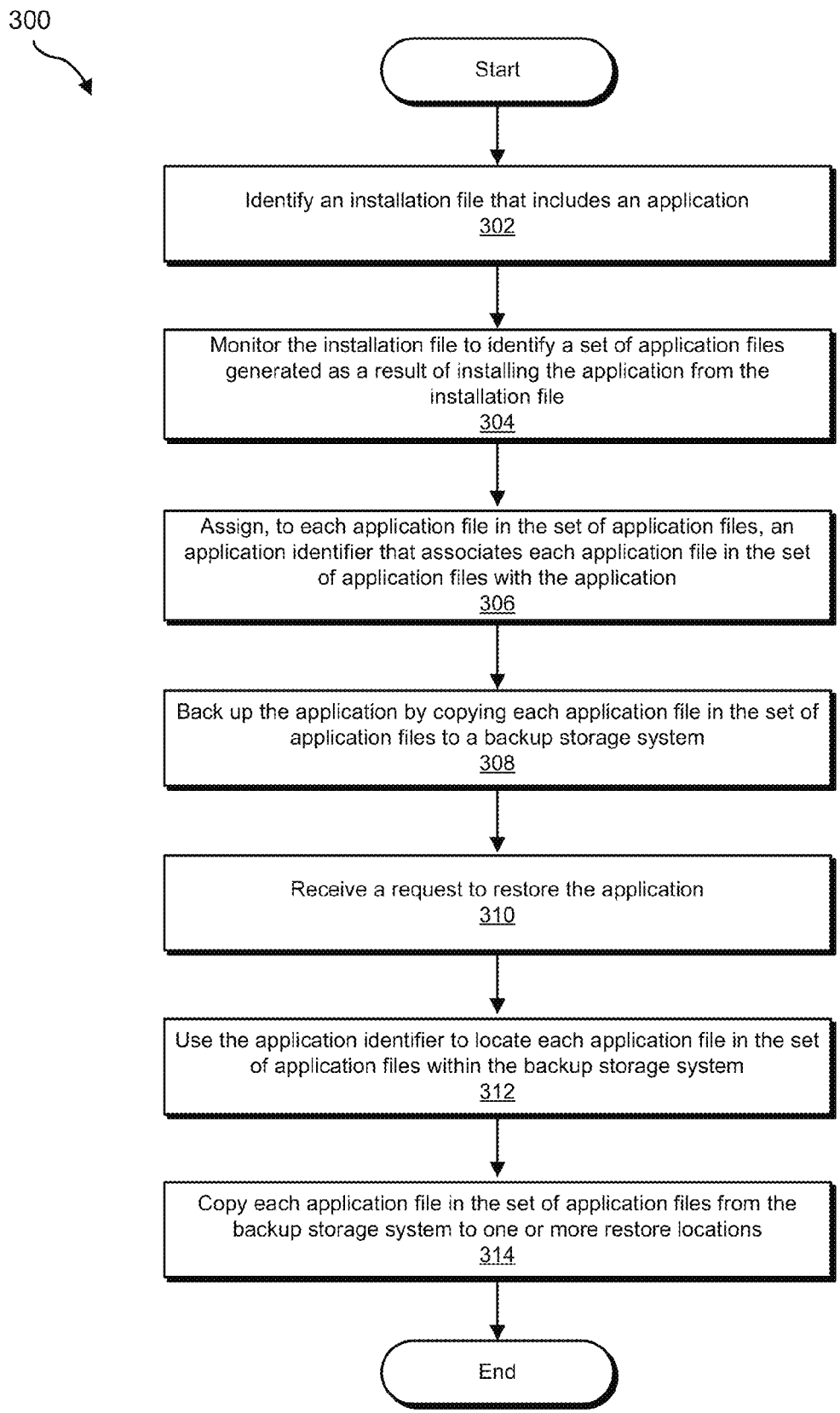
FIG. 3 is a flow diagram of an exemplary method for restoring applications.
Figure 4:
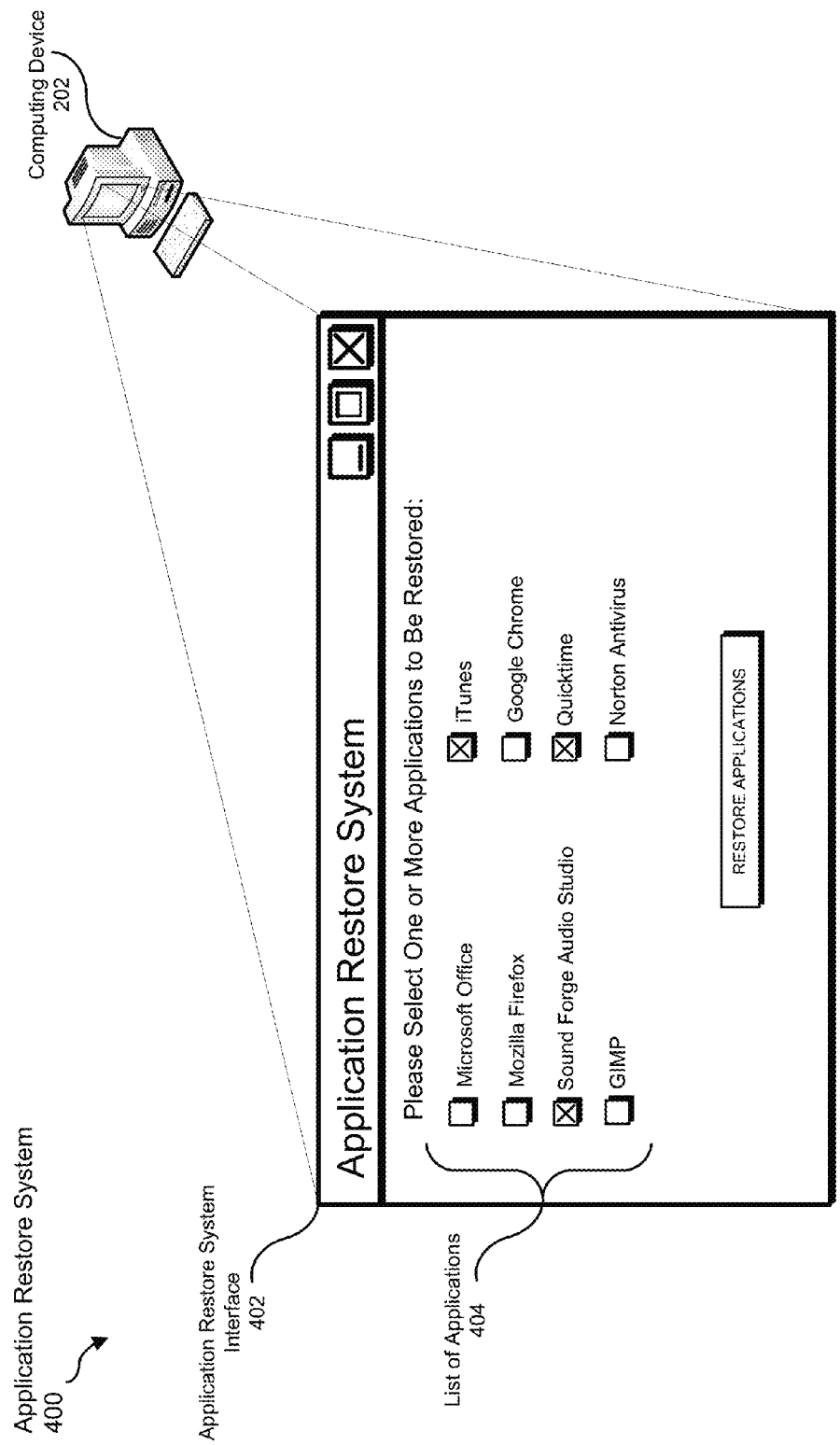
FIG. 4 is a block diagram of an exemplary application restore system for restoring applications.

The following will provide, with reference to FIGS. 1-2 and 4, detailed descriptions of exemplary systems for restoring applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for restoring applications. As illustrated in this figure, exemplary system 100 may include one or more modules 102 for performing one or more tasks. For example, and as will be explained in greater detail below, exemplary system 100 may include a monitoring module 104 programmed to identify an installation file that includes an application.

Monitoring module 104 may also be programmed to monitor the installation file in order to identify a set of application files generated as a result of installing the application from the installation file. Monitoring module 104 may be further programmed to assign, to each application file in the set of application files, an application identifier that associates each application file in the set of application files with the application. In addition, and as will be described in greater detail below, exemplary system 100 may include a backup module 106 programmed to back up the application by copying each application file in the set of application files to a backup storage system.

Exemplary system 100 may also include a restoration module 108 programmed to use the application identifier to locate each application file in the set of application files within the backup storage system. Restoration module 108 may be further programmed to copy each application file in the set of application files from the backup storage system to one or more restore locations. In some embodiments, exemplary system 100 may include an interface module 110 programmed to present, to a user, a list of applications that have been backed up. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include an application-identifier database 122 configured to store application identifiers that associate application files with an application.

In addition, Exemplary system 100 may include a backup-storage database 124 configured to store copied application files associated with the application. In some embodiments, exemplary system 100 may also include a file system 126 configured to store a file system of a computing device.

Databases 120 in FIG. 1 may represent a portion of one or more computing devices. For example, databases 120 may represent a portion of server 206 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may include one or more of modules 102, application-identifier database 122, and file system 126.

In some embodiments, application-identifier database 122 may include application identifier 210. Application identifier 210 generally represents any identifier capable of identifying application files associated with an application. Examples of application identifier 210 include, without limitation, hashes, checksums, digital fingerprints, or any other suitable identifiers.

In at least one embodiment, file system 126 may include application files 208(1)-(N) associated with an application. Each of application files 208(1)-(N) may include application identifier 210 in order to identify each of application files 208(1)-(N) as part of the application. Each of application files 208(1)-(N) may be any type of executable or data file. File system 126 may also include an installation file 212. Installation file 212 generally represents any type or form of file that installs or can be used to install an application. Examples of installation files include executable files, MICROSOFT INSTALLER (MSI) packages, LINUX RPM packages, and/or any other type of file that may include application data used to install an application.

In certain embodiments, server 206 may include backup-storage database 124. Backup-storage database 124 may include application files 208(1)-(N) that have been copied to backup-storage database 124 in order to backup an application. Each of application files 208(1)-(N) copied to backup-storage database 124 may include application identifier 210 in order to identify each of application files 208(1)-(N) copied to backup-storage database 124 as part of the application that has been backed up. Although not illustrated in FIG. 2, backup-storage database 124 may also be located locally on computing device 202 rather than on server 206.

In one embodiment, and as will be described in greater detail below, computing device 202 may be programmed to identify an installation file that includes an application. Computing device 202 may also be programmed to monitor the installation file to identify a set of application files generated as a result of installing the application from the installation file. In addition, computing device 202 may be programmed to assign, to each application file in the set of application files, an application identifier that associates each application file in the set of application files with the application.

In some embodiments, computing device 202 may be programmed to back up the application by copying each application file in the set of application files to a backup storage system. Computing device 202 may be also programmed to receive a request to restore the application. Computing device 202 may be further programmed to restore the application by using the application identifier to locate each application file within the backup storage system and copying each application file from the backup storage system to one or more restore locations.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of restoring applications and providing database services to computing device 202 via network 204. Such database services may include storage and distribution of application files associated with an application. Server 206 may also incorporate a storage controller and/or provide storage management services. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for restoring applications. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302, monitoring module 104 may, as part of computing device 202, identify an installation file that includes an application.

Step 302 may be performed in a variety of ways. In some embodiments, monitoring module 104 may scan file system 126 in order to identify each installation file located within file system 126. For example, while scanning file system 126, monitoring module 104 may identify installation file 212 and determine that installation file 212 is an installation file that includes an application. Monitoring module 104 may scan file system 126 periodically, upon receiving a request, or upon detecting a particular event.

In other embodiments, monitoring module 104 may monitor file system 126 in order to detect when an installation file within file system 126 has been launched to install an application. For example, while monitoring file system 126, monitoring module 104 may detect that installation file 212 has been launched to install the application. In this example, monitoring module 104 may identify installation file 212 upon detecting that installation file 212 has been launched to install the application. Installation file 212 may be an executable file or a data file that includes application information used by an installer to install the application.

At step 304 in FIG. 3, upon identifying the installation file, monitoring module 104 may monitor the installation file in order to identify a set of one or more application files generated as a result of installing the application from the installation file. For example, monitoring module 104 may monitor installation file 212 in order to identify application files 208(1)-(N) (i.e., the set of application files) generated as a result of installing the application from installation file 212. Each of application files 208(1)-(N) may be an executable file or a data file.

Step 304 may be performed in a variety of ways. For example, monitoring module 104 may identify each file that is written to file system 126 as part of the installation process of the application. In such embodiments, monitoring module 104 may include a file system filter driver that monitors writes to file system 126 to identify files associated with the application installation.

Additionally or alternatively, monitoring module 104 may identify application files 208(1)-(N) by identifying one or more directories to which application files are installed and identifying files within such directories. In some embodiments, all of application files 208(1)-(N) may be located in a single directory within file system 126. Alternatively, application files 208(1)-(N) may be located in various directories within file system 126.

At step 306 in FIG. 3, monitoring module 104 may assign, to each application file in the set of application files, an application identifier that associates each application file in the set of application files with the application. Monitoring module 104 may assign application identifier 210 to each of application files 208(1)-(N) in order to associate each of application files 208(1)-(N) with the application. Examples of application identifier 210 include, without limitation, hashes, checksums, digital fingerprints, or any other suitable type of information for identifying an application.

Step 306 may be performed in a variety of ways. In some embodiments, if an application identifier has not yet been created for the application, monitoring module 104 may create application identifier 210 and then assign application identifier 210 to each of application file 208(1)-(N). For example, upon determining that an application identifier has not yet been created for the application, monitoring module 104 may create application identifier 210 and assign application identifier 210 to application files 208(1)-(N) in order to associate these files with the application. Monitoring module 104 may use a hash or signature of any file associated with the application (e.g., installation file 212 or any of application files 208(1)-(N)) as application identifier 210. In other embodiments, if application identifier 210 already exists, monitoring module 104 may simply locate application identifier 210 within application-identifier database 122 and then assign application identifier 210 to each of application files 208(1)-(N).

Monitoring module 104 may assign application identifier 210 to each of application files 208(1)-(N) by storing application identifier 210 as metadata of each of application files 208(1)-(N). This metadata may be stored within each of application files 208(1)-(N) or within one or more storage locations associated with application files 208(1)-(N). Alternatively, application identifier 210 may be associated with each of application files 208(1)-(N) by associating hashes (or any other type of identifier) of application files 208(1)-(N) with application identifier 210 in local or remote database. Any other suitable mechanism may also be used to associate application identifier 210 with each of application files 208(1)-(N).

At step 308 in FIG. 3, backup module 106 may back up the application by copying each application file in the set of application files to a backup storage system. For example, backup module 106 may back up the application by copying each of application files 208(1)-(N) to backup-storage database 124. Each of application files 208(1)-(N) stored in backup-storage database 124 may include application identifier 210 to identify each application file as part of the application installed on computing device 202 by installation file 212.

Step 308 may be performed in any suitable manner. In some embodiments, backup module 106 may send, via network 204, each of application files 208(1)-(N) to backup-storage database 124 located on server 206. In additional embodiments, although not illustrated in FIG. 2, backup module 106 may copy each of application files 208(1)-(N) to a backup storage system located locally on computing device 202.

Backup module 106 may also include application identifier 210 as metadata of each of application files 208(1)-(N) copied to backup-storage database 124. This metadata may be stored within each of application files 208(1)-(N) copied to backup-storage database 124. Alternatively, application identifier 210 may be stored in one or more storage locations associated with the backed up copies of application files 208(1)-(N) copied to backup-storage database 124.

In some embodiments, prior to backing up the application, backup module 106 may ensure that the application is functioning properly in order to avoid restoring the application to an unhealthy state at a later point in time. For example, backup module 106 may verify that one or more executable files and/or data files associated with the application are not corrupt before backing up the application.

If backup module 106 has previously backed up the application, backup module 106 may back up an updated version of the application by copying only those of application files 208(1)-(N) that have been generated or modified since the application was previously backed up. For example, if backup module 104 had backed up the application before application file 208(N) was generated, backup module 104 may back up an updated version of the application by copying only application file 208(N) to backup-storage database 124 after application file 208(N) has been generated.

At step 310 in FIG. 3, restoration module 108 may receive a request to restore the application. For example, when the application is no longer functioning properly, restoration module 108 may receive a request to restore the application to a previous, healthy state. This request may be any type or form of communication that prompts restoration module 108 to restore the application. For example, a local or remote restoration application may send the request to restore the application.

Step 310 may be performed in a variety of ways. In one embodiment, monitoring module 104 may monitor the application in order to determine when the application is no longer functioning properly. Upon determining that the application is no longer functioning properly, monitoring module 104 may generate a request to restore the application from application files 208(1)-(N) copied to backup-storage database 124. Restoration module 108 may then receive the request to restore the application.

In another embodiment, interface module 110 may present, to a user of computing device 202, a list of one or more applications that have been backed up. For example, interface module 110 may present a list of 8 applications that have been backed up to backup-storage database 124. This list of applications may enable the user to select one or more applications to be restored from backup-storage database 124. Interface module 110 may generate the request to restore the application upon determining that the user has selected the application from the list of applications. Restoration module 108 may then receive the request to restore the application.

FIG. 4 is a block diagram of an exemplary application restore system 400 for restoring applications. As illustrated in FIG. 4, exemplary application restore system 400 may include an application restore system interface 402 that presents, to a user of computing device 202, a list of applications 404 that have been backed up. Applications included in list of applications 404 may be backed up to (or stored within) backup-storage database 124. The user may select one or more of the applications included in list of applications 404 in order to generate a request to restore such applications selected by the user.

In some embodiments, a user may be presented with a list of application files associated with an application and may be prompted to select one or more of the application files to restore (or to skip) as part of the restoration process. Enabling a user to select or deselect individual files for restoration may be useful in a variety of contexts. For example, if a file is associated with two applications (as discussed below), an administrator may want to restore the file with a restoration of the first application but not with a restoration of the second application.

In various embodiments, interface module 110 may cause application restore system interface 402 to be displayed as a graphical user interface on computing device 202. Computing device 202 may display application restore system interface 402 on any suitable output device capable of displaying a visual output (e.g., a monitor).

Application restore system interface 402 may be capable of receiving, from the user of computing device 202, information used to identify one or more of the applications included in list of applications 404. For example, a user of computing device 202 may provide information used to identify ITUNES, SOUND FORGE AUDIO STUDIO, and QUICKTIME to be restored on computing device 202 from backup-storage database 124. Application restore system interface 402 may receive such information through any suitable input device that is capable of communicating with computing device 202 and entering information into application restore system interface 402, including a keyboard, a computer mouse, and/or a touch screen device.

Upon receiving the request to restore the application, restoration module 108 may restore the application as described below in connection with steps 312 and 314 of FIG. 3. At step 312, restoration module 108 may use the application identifier to locate each application file in the set of application files within the backup storage system. For example, restoration module 108 may use application identifier 210 to locate each of application files 208(1)-(N) within backup-storage database 124 of server 206.

Step 312 may be performed in a variety of ways. In one embodiment, restoration module 108 may locate each of application files 208(1)-(N) within backup-storage database 124 by identifying application identifier 210 within each of application files 208(1)-(N) or within one or more storage locations associated with application files 208(1)-(N). For example, restoration module 108 may compare application identifier 210 with application identifiers within backup-storage database 124 to identify files in backup-storage database 124 associated with the application. In this example, upon comparing application identifier 210 with application identifiers of files in backup-storage database 124, restoration module 108 may determine that each of application files 208(1)-(N) includes application identifier 210 and that application files 208(1)-(N) are, therefore, associated with the application to be restored.

In an additional embodiment, backup module 106 may record a list of storage locations where application files 208(1)-(N) were copied while backing up the application, and application identifier 210 may associate the list of storage locations with the application. As such, restoration module 108 may compare application identifier 210 with an application identifier associated with the list of storage locations to determine whether the list of storage locations identifies application files associated with the application. Upon determining that the list of storage locations is associated with the application, restoration module 108 may access the list of storage locations in order to locate each of application files 208(1)-(N).

At step 314 in FIG. 3, restoration module 108 may copy each application file in the set of application files from the backup storage system to one or more restore locations. For example, restoration module 108 may copy each of application files 208(1)-(N) from backup-storage database 124 to one or more restore locations within file system 126. These restore locations may be storage locations where application files 208(1)-(N) are stored within file system 126.

Step 314 may be performed using any suitable file restoration process. For example, restoration module 108 may replace each of application files 208(1)-(N) within file system 126 with application files 208(1)-(N) from backup-storage database 124. Upon completion of step 314 in FIG. 3, exemplary method 300 may terminate.

Although not illustrated in FIG. 3, method 300 may include one or more additional steps. In various embodiments, monitoring module 104 may monitor the application to identify at least one additional application file generated by the application. For example, if application file 208(N) was not generated during installation of the application but, rather, during subsequent execution of the application, monitoring module 104 may identify application file 208(N) when generated during execution of the application. Monitoring module 104 may then assign application identifier 210 to application file 208(N) in order to associate application identifier 210 with the application. The additional application file may be any type of data file.

Monitoring module 104 may also monitor the application to identify at least one additional application file on which the application performs a read/write operation. For example, if application file 208(1) is the executable file of the application, application file 208(1) may read application file 208(N) during execution of the application in order to perform a task. In this example, monitoring module 104 may identify application file 208(N) and determine that application file 208(N) was generated by a different application than the application installed by installation file 212. Monitoring module 104 may then assign application identifier 210 to application file 208(N) in order to associate application identifier 210 with the application even though application file 208(N) was generated by the different application.

In various embodiments, groups of applications may be restored together (e.g., groups of related applications). For example, when restoring a first application, restoration module 108 may receive an additional request to restore an additional application from backup-storage database 124. In some embodiments, restoration module 108 may receive an additional request to restore the application after interface module 110 determines that the user of computing device 202 has also selected the additional application from the list of applications. Upon receiving the additional request, restoration module 108 may restore the additional application at substantially the same time as the first application (e.g., immediately before the application, simultaneously with the application, or immediately after the application).

Figure 5:
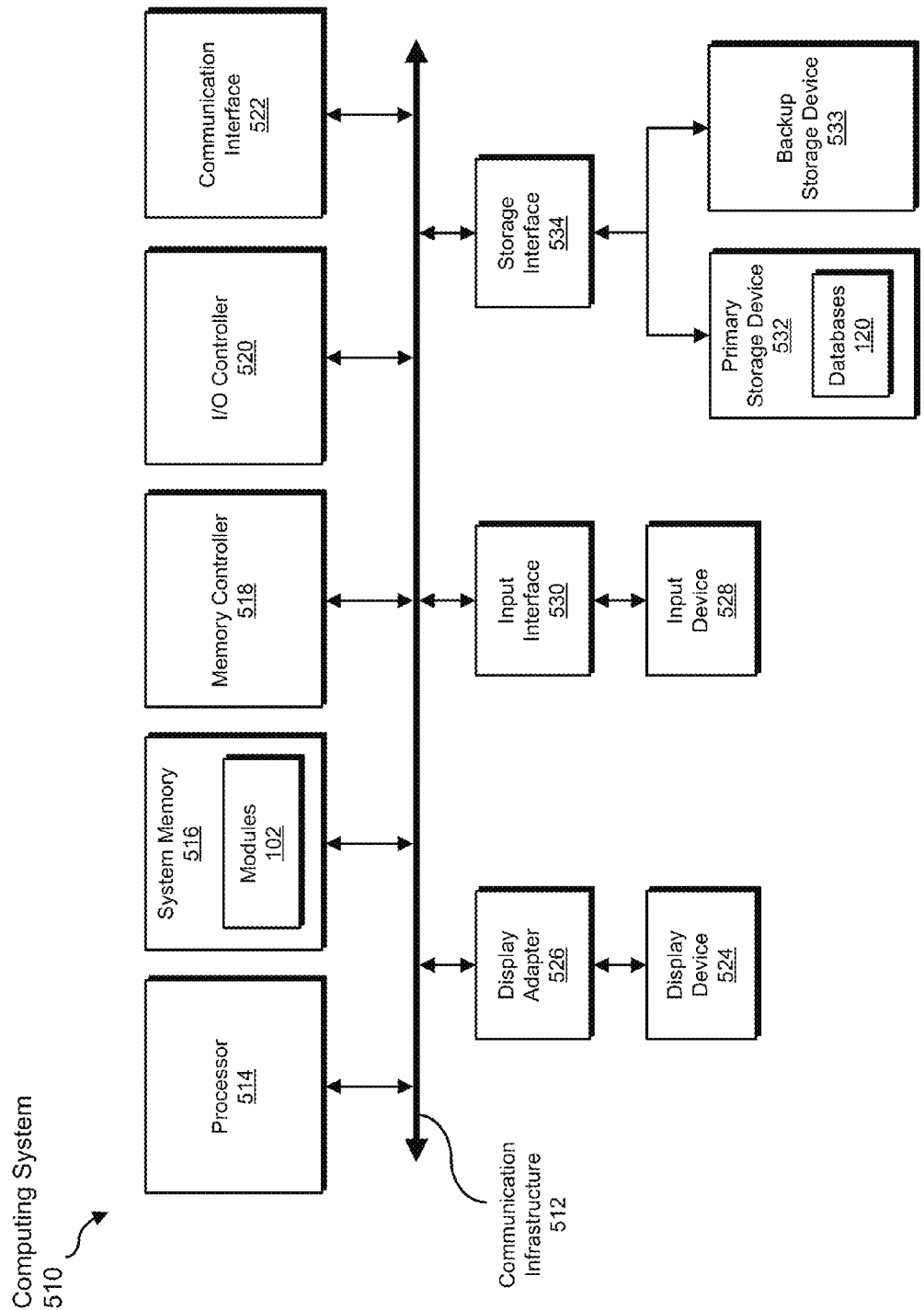
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, monitoring, assigning, backing up, receiving, restoring, using, copying, detecting, determining, creating, storing, including, presenting, and generating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, monitoring, assigning, backing up, receiving, restoring, using, copying, detecting, determining, creating, storing, including, presenting, and generating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, monitoring, assigning, backing up, receiving, restoring, using, copying, detecting, determining, creating, storing, including, presenting, and generating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, monitoring, assigning, backing up, receiving, restoring, using, copying, detecting, determining, creating, storing, including, presenting, and generating steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, monitoring, assigning, backing up, receiving, restoring, using, copying, detecting, determining, creating, storing, including, presenting, and generating steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, monitoring, assigning, backing up, receiving, restoring, using, copying, detecting, determining, creating, storing, including, presenting, and generating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
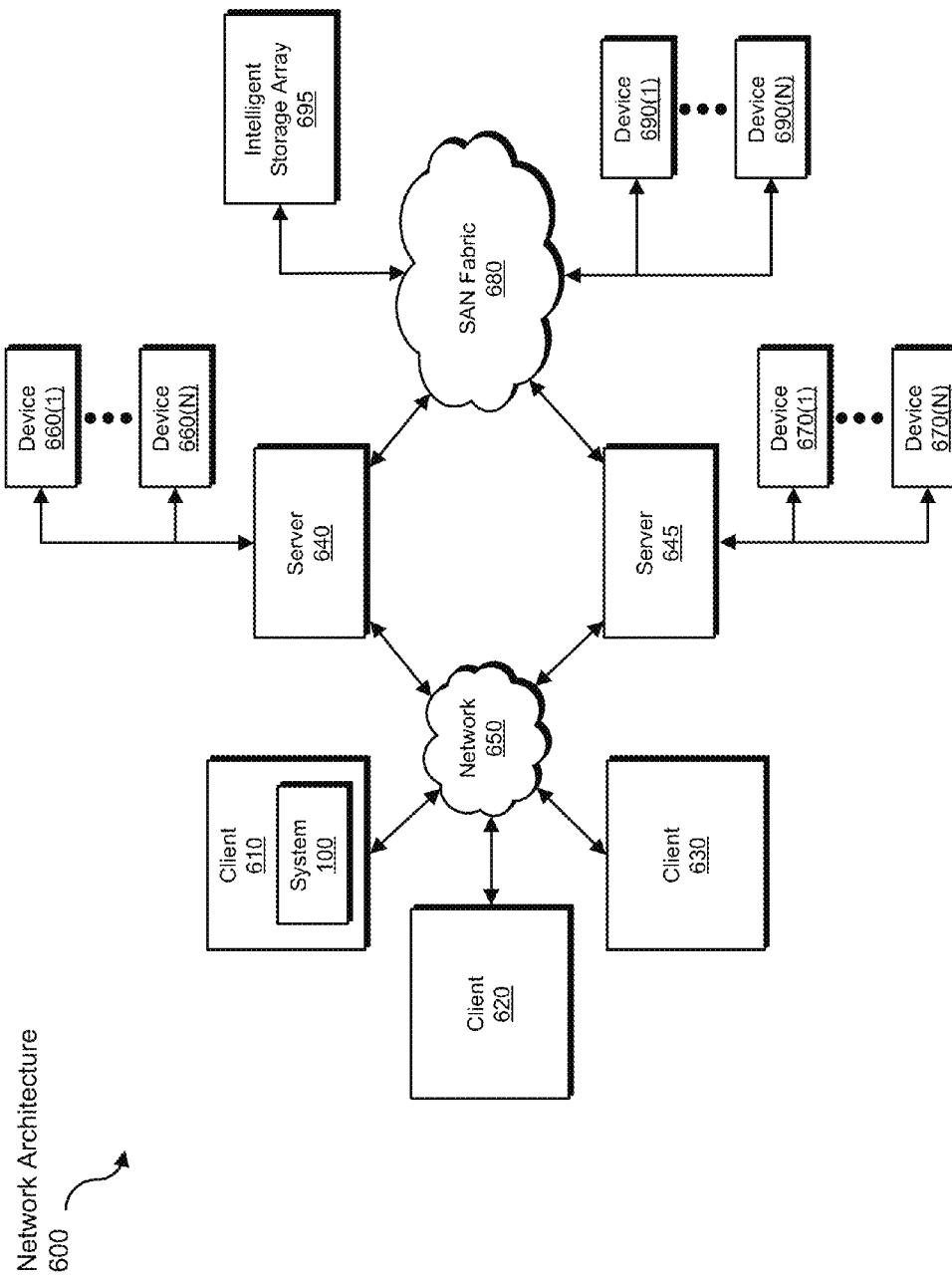
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, monitoring, assigning, backing up, receiving, restoring, using, copying, detecting, determining, creating, storing, including, presenting, and generating steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for restoring applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, restoration module 108 in FIG. 1 may transform a property or characteristic of computing device 202 in FIG. 2 by copying application files 208(1)-(N) from backup-storage database 124 to file system 126 of FIG. 1.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring applications, at least a portion of the method being performed by a computing device comprising at least one processor, the method comprising:

identifying, within a file system of a computing system, an installation file that includes an application on the computing system;

monitoring the installation file within the file system of the computing system;

identifying, while monitoring the installation file, a plurality of application files generated as a result of installing an instance of the application to the computing system from the installation file, the plurality of application files comprising:

an executable file of the application located in a directory within the file system of the computing system;

a data file of the application located in another directory within the file system of the computing system;

associating each application file in the plurality of application files with the application by:

generating a hash that identifies the instance of the application installed to the computing system from the installation file;

storing the hash that identifies the instance of the application within each application file in the plurality of application files generated as a result of installing the instance of the application to the computing system from the installation file;

backing up the instance of the application by copying each application file in the plurality of application files from the computing system to a backup storage system;

receiving a request to perform a partial restore of the file system of the computing system by restoring the instance of the application to the computing system, the partial restore comprising a restore of less than all of the file system of the computing system;

performing the partial restore of the file system of the computing system by restoring the instance of the application to the computing system by:

locating, within the backup storage system, each application file in the plurality of application files by identifying the hash stored within each application file;

copying each application file in the plurality of application files from the backup storage system to one or more restore locations on the computing system.

2. The method of claim 1, further comprising:

monitoring the instance of the application to identify at least one additional application file generated by the instance of the application;

storing the hash that identifies the instance of the application within the additional application file in order to associate the additional application file with the application.

3. The method of claim 1, wherein monitoring the installation file comprises:

detecting that the installation file has been launched to install the instance of the application;

determining that a hash that identifies the instance of the application has not yet been generated.

4. The method of claim 1, wherein storing the hash within each application file in the plurality of application files comprises storing the hash as metadata within each application file in the plurality of application files.

5. The method of claim 1, wherein backing up the instance of the application by copying each application file in the plurality of application files to the backup storage system comprises including the hash as metadata of each application file copied to the backup storage system.

6. The method of claim 1, further comprising:

monitoring the instance of the application to identify at least one additional application file on which the application performs a read/write operation;

storing the hash that identifies the instance of the application within the additional application file in order to associate the additional application file with the application.

7. The method of claim 1, further comprising, prior to receiving the request to perform the partial restore:

presenting, to a user, a list of applications that have been backed up;

determining that the user has selected the application from the list of applications;

generating the request to perform the partial restore upon determining that the user has selected the application.

8. The method of claim 1, further comprising:

identifying at least one additional application that has been backed up;

receiving an additional request to restore the additional application;

restoring the additional application at substantially the same time as the instance of the application.

9. The method of claim 1, wherein the installation file comprises at least one of:

an executable file;

a data file that includes application information used by an installer to install the instance of the application.

10. The method of claim 1, wherein associating each application file in the plurality of application files with the application comprises:

generating a hash of the installation file that includes the application;

storing the hash of the installation file within each application file in the plurality of application files generated as a result of installing the instance of the application from the installation file.

11. The method of claim 1, wherein the hash comprises at least one of:

a checksum;

a digital fingerprint.

12. The method of claim 1, further comprising, prior to receiving the request to restore the instance of the application:

presenting, to a user, a list that identifies the plurality of application files that have been copied to the backup storage system by backing up the instance of the application;

determining that the user has selected the one or more of the plurality of application files from the list;

generating the request to perform the partial restore based at least in part on the selection by the user of the one or more of the plurality of application files.

13. A system for restoring applications, the system comprising:

at least one hardware processor;

a monitoring module programmed to direct the hardware processor to:

identify, within a file system of a computing device, an installation file that includes an application on the computing device;

monitor the installation file within the file system of the computing device;

identify, while monitoring the installation file, a plurality of application files generated as a result of installing an instance of the application to the computing device from the installation file, the plurality of application files comprising:

an executable file of the application located in a directory within the file system of the computing device;

a data file of the application located in another directory within the file system of the computing device;

associate each application file in the plurality of application files with the application by:

generating a hash that identifies the instance of the application installed to the computing device from the installation file;

storing the hash that identifies the instance of the application within each application file in the plurality of application files generated as a result of installing the instance of the application to the computing device from the installation file;

a backup module programmed to direct the hardware processor to back up the instance of the application by copying each application file in the plurality of application files from the computing device to a backup storage system;

a restoration module programmed to direct the hardware processor to:

receive a request to perform a partial restore of the file system of the computing device by restoring the instance of the application to the computing device, the partial restore comprising a restore of less than all of the file system of the computing device;

performing the partial restore of the file system of the computing device by restoring the instance of the application to the computing device by:

locating, within the backup storage system, each application file in the plurality of application files by identifying the hash stored within each application file;

copying each application file in the plurality of application files from the backup storage system to one or more restore locations on the computing device.

14. The system of claim 13, wherein the monitoring module is programmed to direct the hardware processor to:

monitor the instance of the application to identify at least one additional application file generated by the instance of the application;

store the hash that identifies the instance of the application within the additional application file in order to associate the additional application file with the application.

15. The system of claim 13, wherein the monitoring module is programmed to direct the hardware processor to:

detect that the installation file has been launched to install the instance of the application;

determine that a hash that identifies the instance of the application has not yet been generated.

16. The system of claim 13, wherein the monitoring module is programmed to direct the hardware processor to store the hash as metadata within each application file in the plurality of application files.

17. The system of claim 13, wherein the backup module is programmed to direct the hardware processor to include the hash as metadata of each application file copied to the backup storage system.

18. The system of claim 13, wherein the monitoring module is programmed to direct the hardware processor to:

monitor the instance of the application to identify at least one additional application file on which the application performs a read/write operation;

store the hash that identifies the application within the additional application file in order to associate the additional application file with the application.

19. The system of claim 13, further comprising an interface module programmed to direct the hardware processor to:

present, to a user, a list of applications that have been backed up;

determine that the user has selected the application from the list of applications;

generate the request to perform the partial restore upon determining that the user has selected the application.

20. A non-transitory computer-readable-storage medium comprising one or more computer-executable instructions that, when executed by at least one processor of a computing device, cause the computing device to:

Identify, within a file system of a computing device, an installation file that includes an application on the computing device;

monitor the installation file within the file system of the computing device;

identifying, while monitoring the installation file, a plurality of application files generated as a result of installing an instance of the application to the computing device from the installation file, the plurality of application files comprising:

an executable file of the application located in a directory within the file system of the computing device;

a data file of the application located in another directory within the file system of the computing device;

associate each application file in the plurality of application files with the application by:

generating a hash that identifies the instance of the application;

storing the hash that identifies the instance of the application within each application file in the plurality of application files generated as a result of installing the instance of the application to the computing device from the installation file;

back up the instance of the application by copying each application file in the plurality of application files from the computing device to a backup storage system;

receive a request to perform a partial restore of the file system of the computing device by restoring the instance of the application to the computing device, the partial restore comprising a restore of less than all of the file system of the computing device;

performing the partial of the file system of the computing device by restoring the instance of the application to the computing device by:

locating, within the backup storage system, each application file in the plurality of application files by identifying the hash stored within each application file;

copying each application file in the plurality of application files from the backup storage system to one or more restore locations on the computing device.

* * * * *